(12) United States Patent
Morbiato

(10) Patent No.: US 10,502,183 B2
(45) Date of Patent: Dec. 10, 2019

(54) WIND TURBINE

(71) Applicant: Tommaso Morbiato, Padua (IT)

(72) Inventor: Tommaso Morbiato, Padua (IT)

(*) Notice: Subject to any disclaimer, the term of this patent is extended or adjusted under 35 U.S.C. 154(b) by 492 days.

(21) Appl. No.: 15/036,944

(22) PCT Filed: Nov. 14, 2014

(86) PCT No.: PCT/IB2014/066037
§ 371 (c)(1),
(2) Date: May 16, 2016

(87) PCT Pub. No.: WO2015/071863
PCT Pub. Date: May 21, 2015

(65) Prior Publication Data
US 2016/0290316 A1    Oct. 6, 2016

(30) Foreign Application Priority Data
Nov. 15, 2013    (IT) .............................. PD2013A0312

(51) Int. Cl.
*F03D 3/06*    (2006.01)
*F03D 7/06*    (2006.01)

(52) U.S. Cl.
CPC .............. *F03D 3/064* (2013.01); *F03D 7/06* (2013.01); *F05B 2240/202* (2013.01); *F05B 2240/214* (2013.01); *F05B 2250/41* (2013.01); *F05B 2260/502* (2013.01); *F05B 2260/85* (2013.01); *Y02E 10/74* (2013.01)

(58) Field of Classification Search
CPC ... F03D 7/06; F03D 3/06; F03D 3/061; F03D 3/062; F03D 3/064; Y02E 10/74; F05B 2240/211; F05B 2240/214; F05B 2250/41; F05B 2260/502; F05B 2260/85
USPC ......................................................... 415/4.4
See application file for complete search history.

(56) References Cited

U.S. PATENT DOCUMENTS

| 4,236,504 A | 12/1980 | Cornelison, Jr. | |
| 4,334,823 A * | 6/1982 | Sharp | F03D 3/067 416/117 |
| 5,083,901 A * | 1/1992 | Griffin, Jr. | F03D 3/061 416/119 |
| 2007/0257494 A1* | 11/2007 | Vida Marques | F03D 3/067 290/55 |
| 2012/0049534 A1 | 3/2012 | Kikuchi | |

FOREIGN PATENT DOCUMENTS

| DE | 29716129 U1 | 1/1999 |
| DE | 102008034077 A1 | 9/2009 |

* cited by examiner

*Primary Examiner* — Christopher Verdier
*Assistant Examiner* — Elton K Wong
(74) *Attorney, Agent, or Firm* — Themis Law

(57) ABSTRACT

A wind turbine includes a rotation axis suited to be positioned in space in any way and N blades indirectly constrained to the axis through one or more radial arms that are integral with the axis, wherein the blades can translate in a radial direction with respect to the axis during the rotation of the blades.

8 Claims, 13 Drawing Sheets

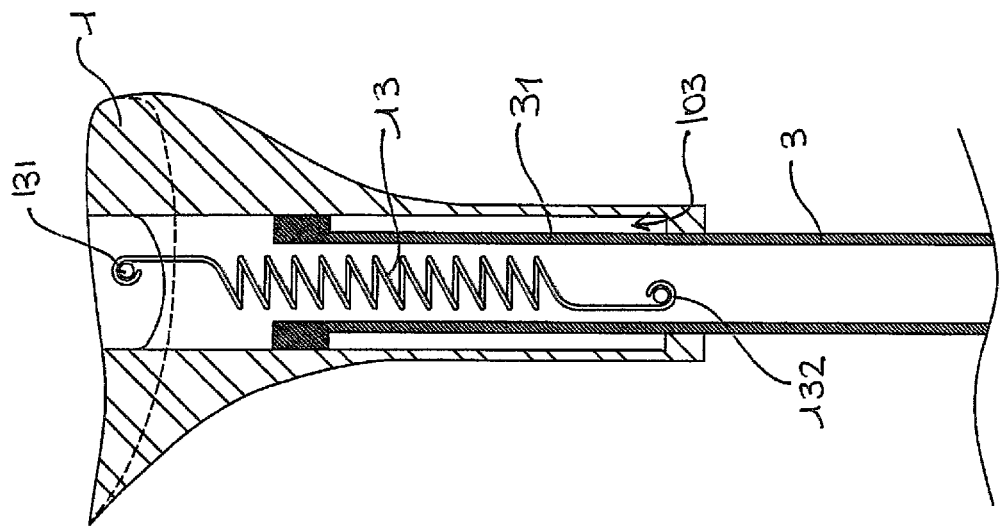
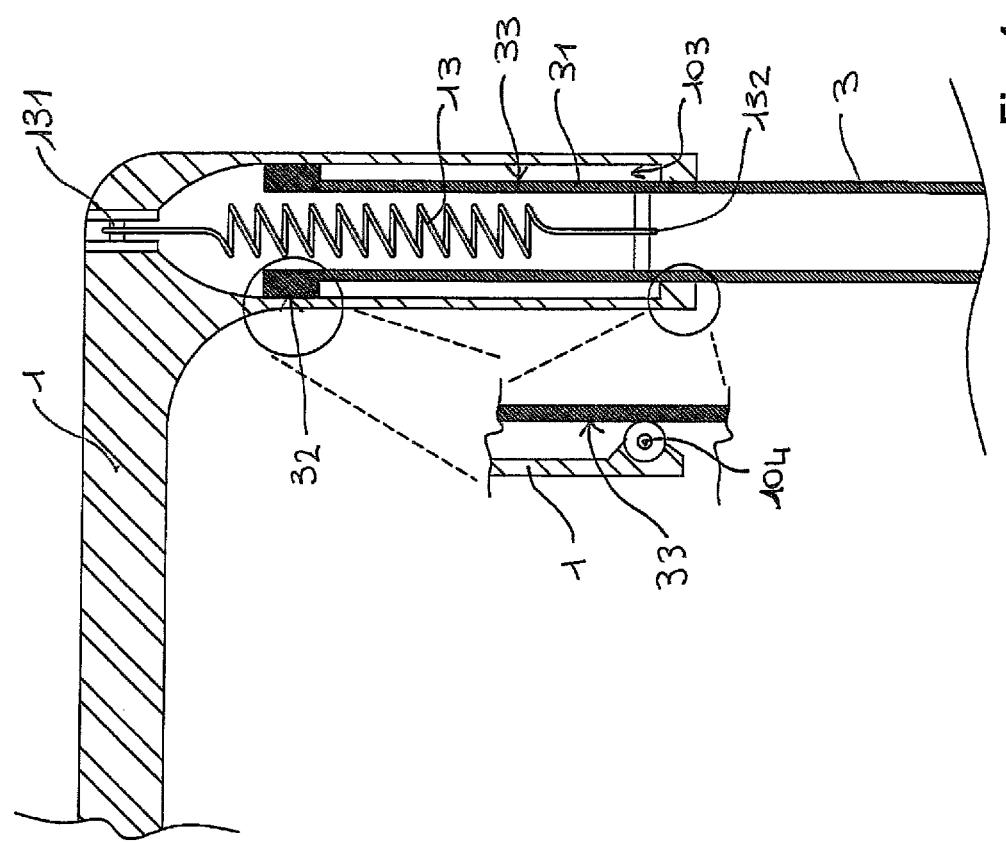

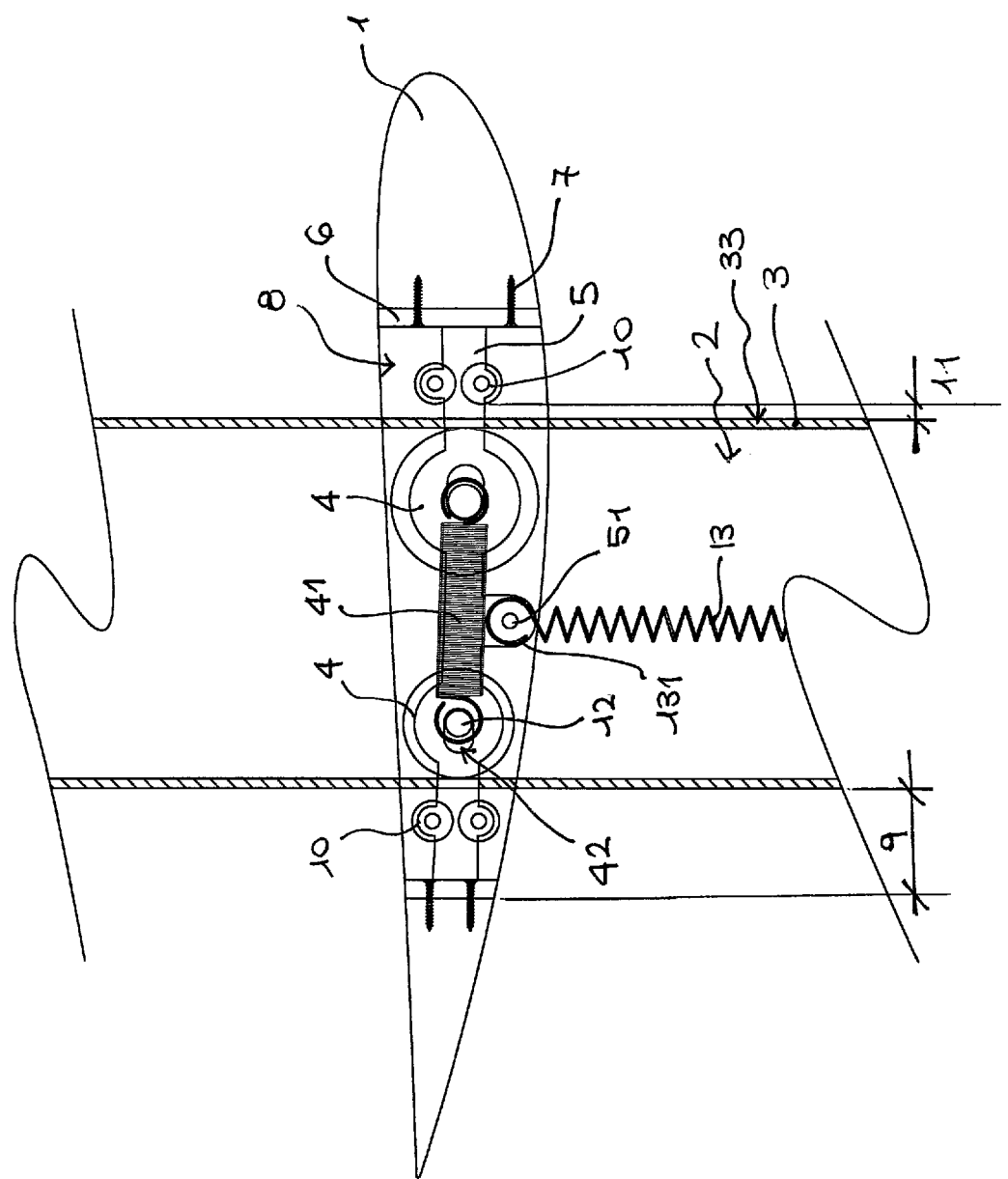

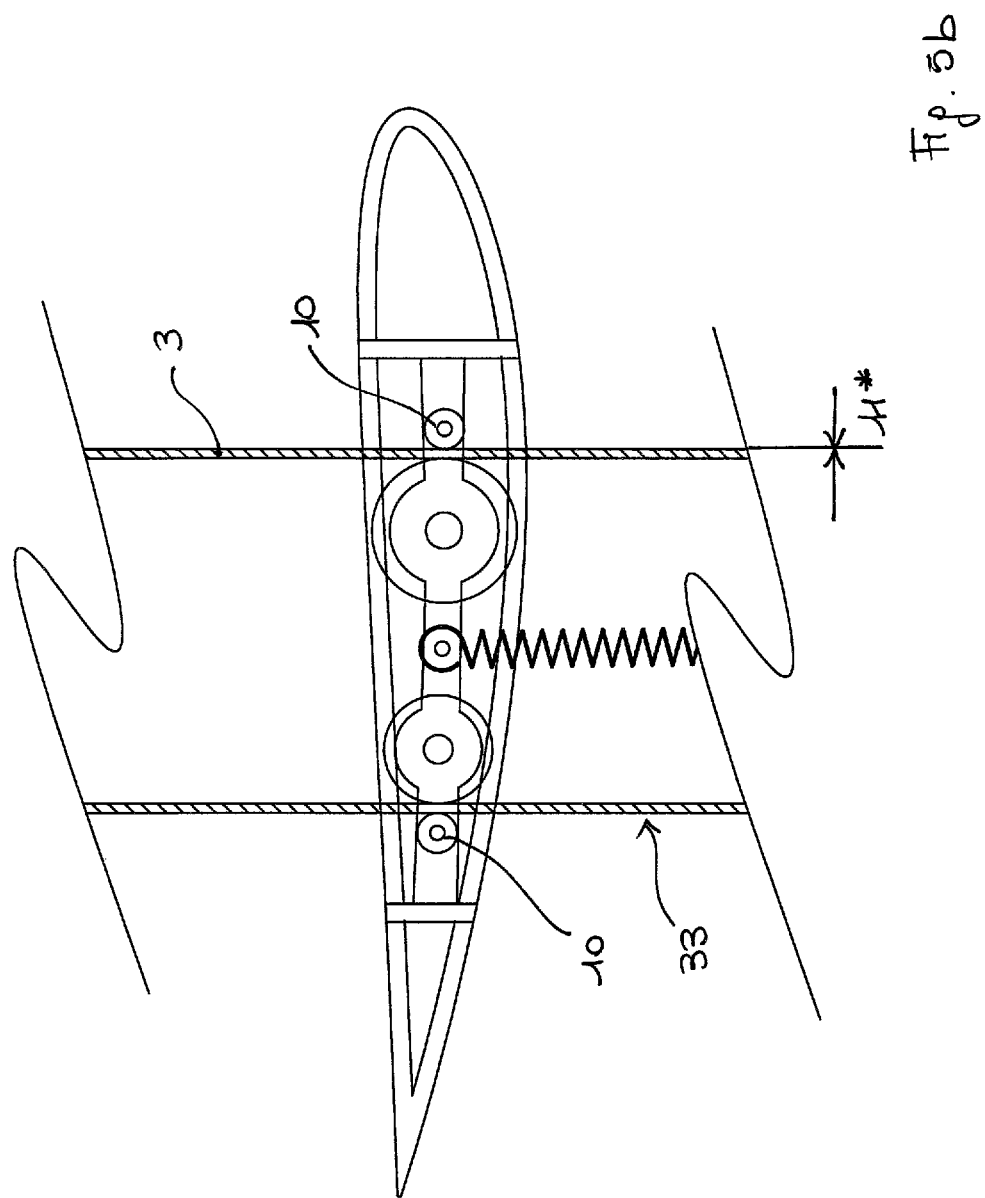

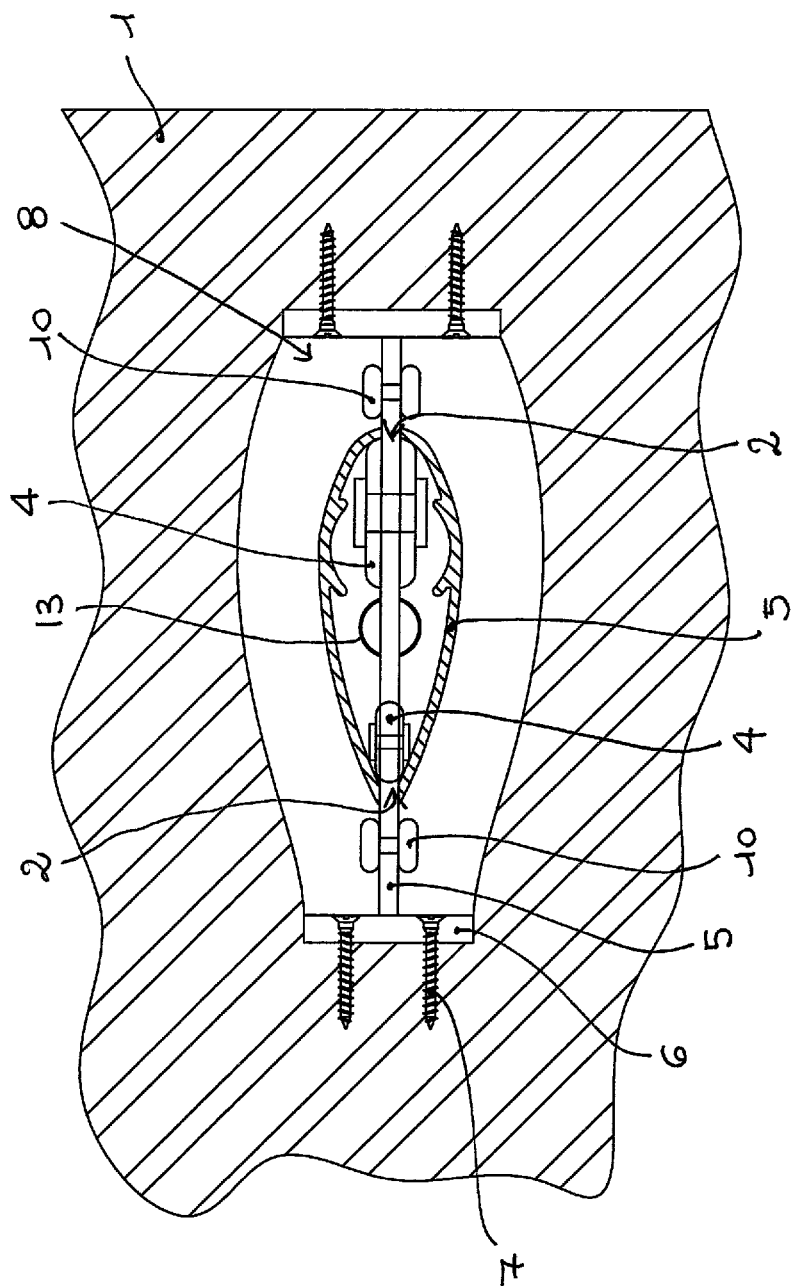

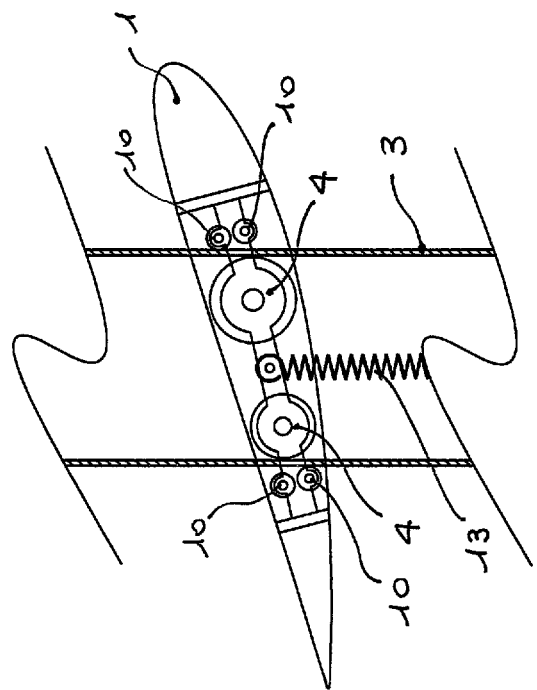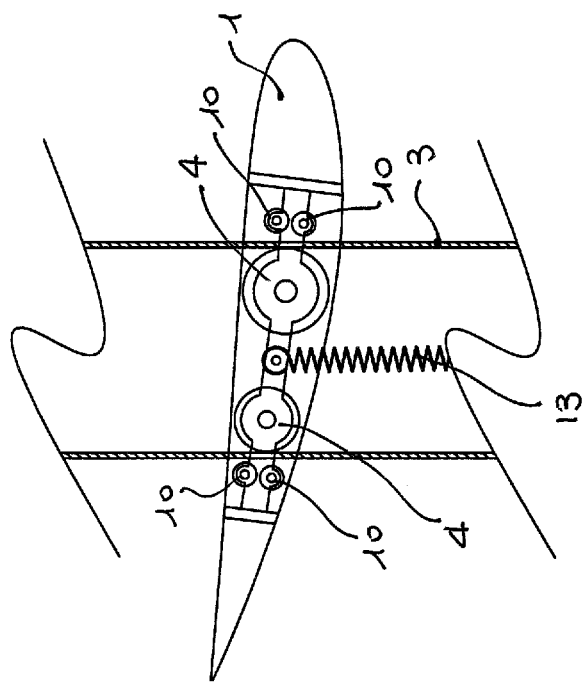
Fig. 5d

WIND TURBINE

INTRODUCTION

This invention relates to energy conversion systems and, more particularly, to wind turbine systems designed for both generally continuous winds and frequently variable winds. The invention introduces the conservation of the movement through new inertial devices with an enhanced self-startup with new selective stop devices.

FIELD OF THE INVENTION

The recent push for energy policies focused on more eco-sustainable economic development has led to the extraction of energy from the wind source. The machines for the collection of energy from atmospheric wind are divided into horizontal axis wind turbines (HAWT) and vertical axis wind turbines (VAWT). In a generic scenario where machines are not necessarily operating in atmospheric wind (thus in a horizontal wind) the HAWT are machines in which the rotating axis is parallel to the wind vector (HAWTs become PAWTs) whereas VAWTs are machines the axis of which crosses the wind vector (VAWTs become CAWTs).

While PAWTs must rotate their axis against the wind vector, CAWTs are inherently omnidirectional in the plane containing the wind vector.

CAWTs are divided into drag and lift operated machines: drag driven devices, named after Savonius, generally work with TSR~1, while lift driven devices, named after Darrieus, work at TSR>>1. The TSR is defined as the ratio between the tangential speed of the tip of a blade and the actual velocity of the wind. Given that power is the product of torque×rotational speed, it follows that Darrieus machines are more efficient than Savonius machines, but on the other hand lift driven devices are also known for their problems to start rotating, to the point that most of the recent patents relating to CAWTs aim to improve the self-starting ability of those machines.

Another recent class of patents covers the general and innovative idea of collecting energy from the particular source of energy contained in the wind generated by the passage of transport systems, such as motorways, highways, tunnels, and railways. In general, these patents contain conceptual indications for the installation of a wind power plant in a generic site along a road transport system, but there is no particular invention of a mechanical device specifically intended for the wind generated by traffic. The collection of wind energy generated by vehicular traffic can be seen as the search for a sustainable energy policy in combination with more sustainable development in the transport sector.

For example, in discussing the optimal level of renewable energy sources, Munasinghe (2009) indicates it as the amount by which the marginal cost of a renewable energy system is exactly equal to the costs avoided which are associated with energy generated from fossil fuels, including environmental damage. Regarding wind power plants applied to traffic-generated wind, we can see that there will always be an optimum incremental amount of energy supply associated with an increase in demand for transport: this quantity is at its maximum today, because transport systems are based on fossil fuels, and there will always be a basic quantity intrinsically connected to the aerodynamic losses, assuming a more sustainable future in which transport systems are not based on fossil fuels, and that fixed costs of energy harvesting from traffic-generated wind are lower than the relative aerodynamic losses.

The CAWT turbine of the invention is usable for the aforementioned wind power generation using traffic-generated wind, but highlighting that this specific use is included in the more generic context of variable wind turbines the present invention is particularly related to.

STATE OF THE ART

The Darrieus patent, 1931 U.S. Pat. No. 1,835,018, can be considered the progenitor of lift driven CAWT wind turbines: Darrieus envisaged blades with straight H or catenary geometry, which is a good solution in large applications to reduce structural burdens due to centrifugal forces, which in addition introduced a first application of a variable-pitch blade.

A family of patents for CAWT turbines arising from the Darrieus concept relates to the improvement of the ability to start rotating by themselves taking advantage of the principles of passive variable pitching systems, as in U.S. Pat. No. 4,299,537. The startup is in fact related to a significant variation of the angle of attack at low blade speed/wind speed ratios, which involves exceeding the stall threshold of the blades, thereby minimizing the lift and therefore the torque; an efficient passive system to change the blades pitch reduces the angle of attack below the stall threshold at low TSRs, and must provide for a correction from minimal to nothing for higher TSRs. The pivoting of the blades giving the variation of the pitch is obtained by equalizing the aerodynamic moment with the reactivation moment through a torsion spring activated by a mechanism. In particular, the reactivation torsion is enabled by the centripetal acceleration of a rigid component [Kirke, 1998] or by an elastomer component the stiffness of which increases with the centrifugal force [Pawsey]. The latter provides more control at high TSRs to effectively lock the blade and prevent additional and unnecessary pitching.

The family of patents relating to variable-pitch blades is supplemented by other related concepts: the pivoting of blade extensions can be used to control the speed of rotation, as in the case for example of US2013078092; or as in the case of the flaps hinged to the blade meridian which can be used to inhibit over speeds, as in the case of US20120195761A1.

Another family of patents relating to the CAWTs uses ancillary movement/pivoting of portions of the blade in order to modify the surface exposed to the air resistance. As a result of the fact that the pivoted blades can be lift driven after the initial transient, or remain under the influence of the drag, these patents can be considered to be based on the Darrieus or Savonius concept.

In US20120039714 the blades are radially configured with respect to the rotor and have the ability to pivot on their axis modifying their drag surface, while in patent WO13026127 the blades use recesses and reliefs to increase the drag surface. In contrast, in U.S. Pat. No. 8,057,159B2 the mobile part of the blade (drag type) translates along the fixed part of the blade itself and is held by radial springs, thus decreasing the drag surface as the speed of rotation increases (together with the centrifugal force). In U.S. Pat. No. 5,083,901A the springs are used to open/close the blades which are V-shaped to maximize the drag surface when open.

A third family of patents for CAWT turbines include an active control of the translation/pivoting of the blades or parts of the blades. In WO2011021733, for example, a servomotor is used to change the distance of the blades from the rotating shaft, and in US2007257494A1 the ancillary movements of the blades (rotating around their axis, translating in the radial direction) are actively controlled by a computer. The active control is applied to maximize/stabilize the collection of energy in the case of variable winds. One last family of patents for CAWT turbines is that using ancillary mechanisms to passively change the geometry of the turbine to obtain the optimal configuration in certain wind conditions. In DE29716129U1, for example, the blades are pivoted on guides in the radial arms and can slide parallel to the radial arm (with low TSRs a drag surface is exposed to the wind) until reaching the final position in the arm, where they can pivot with the blade chord tangentially with respect to the circular movement of the blade (with high TSRs the blade profile works in the lift driven mode). Patent DE29716129U1 also claimed that such sliding/pivoting mechanisms can be activated by automatic controls. In U.S. Pat. No. 5,083,901A the blades are pushed toward the center in the radial direction at low TSRs by the use of compression springs, although the aerodynamic concept is quite different in that the CAWT is not open, it is based on a drum surface generating a Venturi effect with the blades. Patent CN102562441A intends to exploit wind peaks, and the ancillary passive movement of the counterweights is used to limit the deceleration of the turbine in the descending part of a wind peak.

DESCRIPTION OF THE INVENTION

Summary and Description of Figures

The device of the invention is a wind turbine with a configuration that, while adopting the classic Darrieus approach, it is further designed so as to facilitate the initial acceleration and prevent the machine from stopping with the occurrence of brief decreases in the wind source, windless air pockets or, in the case of a longer absence of wind, to stop in a pre-established position that increases the ability of the turbine to self-startup, depending on the embodiment or configuration as described below.

Adding an innovative step to the prior art of the family of patents using ancillary mechanisms to passively change the geometry of the turbine to achieve the optimal configuration in certain wind conditions (U.S. Pat. No. 5,083,901A, DE29716129U1, CN102562441A) is an object and an advantage of this invention to provide new means to adapt the geometry of the machine to variable winds, as described below.

The mechanism of the invention that facilitates the initial acceleration and temporarily prevents the machine from stopping is based on a principle of variable solidity, where the rotor solidity is defined as Nc/R where N is the number of blades, c is the length of the blade chord, and R is the radius of the rotor. The variation relative to the invention is achieved through the radius R, and this variability acts on the main inertia of the machine as $I=Nm_1R^2$ where $m_1$ is the mass of a single blade. The mechanism of the invention allows the development of the minimum inertia during startup to increase acceleration, while offering the maximum inertia in the event of a general decrease of the wind source, in order to reduce the deceleration and maintain a greater rotation speed compared to a machine of the prior art in a similar situation. Depending on the shape of the windless air pocket, its duration, and based on the size of the machine, the mechanism of the invention allows the turbine to avoid stopping, therefore: (1) the consequent following phase requiring energy consumption to restart that would otherwise be indispensable before any phase intended for energy collection is thus avoided, and (2) the machine is maintained at a relatively high speed of rotation which provides it with the ability to directly generate electricity, even during the transitional variable speed.

The overall effect of the invention over the prior art is therefore an improvement of the turbine's operation at variable speeds commonly connected to momentary drops in wind, by the fact that more efficient regions of the power curves of the machine can be exploited.

That is also true considering that with the same blade chord c during the startup/deceleration phase, aerodynamic torques linearly reduced varying with $R F_T R$ (where $F_T$ is the aerodynamic tangential force independent from R), are to be compared with inertia $I=Nm_1R^2$ quadratically reduced with $R^2$.

The details of the invention and the different embodiments can be better understood with the aid of the accompanying drawings in which:

FIG. 1 shows a representation of the first embodiment: a wind turbine (A) in its vertical configuration, that is, with vertical shaft or axle of rotation (Z), with the variable radius (R) of the rotor, where the radius (R) is the distance between the blade (1) and the axis of rotation (Z); in this configuration, the radial movement of each blade (1) with respect to the axis of rotation (Z) of the turbine (A) takes place by telescopic translation.

FIG. 2 shows a representation of the second embodiment: a wind turbine (A) in its horizontal configuration, that is, with horizontal axis of rotation (Y), with variable radius (R) of the rotor; in this configuration, the radial movement of each blade (1) with respect to the axis of rotation (Y) of the turbine (A) takes place by telescopic translation.

FIG. 3a shows a representation of the third embodiment: a further horizontal or vertical configuration with variable radius (R) of the rotor. According to this third embodiment, the design could also envisage a passive gravity system to change the inclination angle of the blade (1); in this configuration the movement of the blades (1) take place by translation on guides or arms (3), with local stop elements (CC) on each of the arms (3) and integral with the aim (3) itself.

FIG. 3b shows a representation of the fourth embodiment: a further horizontal or vertical configuration with variable radius (R) of the rotor. According to this fourth embodiment, the design could also envisage a passive gravity system to change the inclination angle of the blade (1); in this configuration the movement of the blades (1) takes place by translation on guides or arms (3), with stop elements (CC1) fully extended between the arms (3), having for example, the same length as the blades (1).

FIGS. 4a and 4b show, in two sections, respectively a longitudinal section of the blade (1) (FIG. 4a) and a transverse section of the blade (1) (FIG. 4b), the operation of the variable radius (R) by means of the blade (1) mounted with a coaxial traction spring (13) to the radial arm (3), applicable to the first and second embodiment of the invention (FIG. 1, FIG. 2);

FIG. 5a is a sectional view showing the operation of the variable radius (R), by means of the blade (1) bound with a coaxial traction spring (13) to the arm (3) equipped with an aerodynamic stop element (CC, CC1), applicable to the third and fourth embodiments of the invention (FIGS. 3a, 3b); this case also includes the passive gravity system and the possibility of a play between the arm (3) and the blade (1) to change the inclination angle of the blade: in the detailed representation, the blade remains in the intermediate position along the arm (3), between a minimum radius and a maximum radius.

The figures show the main wheels (4) for the radial translation of the blade (1), where the main wheels (4) are free or are kept in contact with the rails (2) of the arms (3) by at least one compression spring (41) bound to the two axles (12) of the main wheels (4), the axles (12) in turn slide in the slotted holes (42).

FIG. 5b is a sectional view showing the operation of the variable radius (R) by means of the blade (1) bound with the coaxial traction spring (13) to the arm (3) equipped with an aerodynamic stop element (CC, CC1), applicable to the second, third and fourth embodiments of the invention (FIGS. 3a, 3b); in this case, by annulling the play between the arm (3) and the blade (1) the passive gravity system to vary the inclination angle of the blade (1) is made ineffective: in the detailed representation, the blade (1) remains in the intermediate position along the arm (3), between a minimum radius and a maximum radius.

FIG. 5c is a plan view of the blade (1) with variable radius bound with the coaxial traction spring to the arm (3) equipped with an aerodynamic stop element applicable to the third or fourth embodiments of the invention, in the latter case with a possible passive system to change the pitch: in the detailed representation, the blade (1) remains in the intermediate position between a minimum radius and a maximum radius.

FIG. 5d shows a schematic representation in two possible positions of how the angle of the blade (1) can be changed.

FIG. 6 shows a section of the blade (1) with variable radius (R) bound through a coaxial traction spring (13) to the arm (3) equipped with an aerodynamic stop element (CC) applicable to the third or fourth embodiments of the invention, in the latter case with a possible passive system to change the pitch: the detailed representation the blade (1) remains in the position limited by the stop element at the maximum radius (R max), and the aerodynamic stop element (CC), together with the blade (1) with a cambered airfoil-shape form in this position a symmetrical airfoil (P).

FIG. 7 shows the selective stop device applicable to the fourth embodiment of the invention in the configuration with the axis (Y) horizontal, indicating the 2 maximum slightly different radii (R max A, R max B) for the selective stop achieved by their own geometry or as a result of the configuration of the spring (13) or by applying weights on the blades (1) or on the arms (3) in the most suitable positions to achieve the desired imbalancing.

In the example in FIG. 7, the stop position is Y-shaped, with the blade (1B) at its maximum radius (R max B) facing down, characterizing the 0° position.

A reduced ratio between blade length and blade chord is the main cause of the development of blade tip vortices that characterize the energy exchange process in the third dimension, that is, out of the plane perpendicular to the machine's axis. This deviation of the wake from the plane is to be avoided as much as possible as it lowers the efficiency of the machine. In particular, in CAWT turbines, the vorticity coming from the tip of the blade is not related to the energy collection mechanism, which is related only to the aforementioned plane vorticity, and therefore, the profile of the blade can be studied so as to avoid this deviation.

DESCRIPTION OF EMBODIMENTS

It is a wind turbine (A) comprising a shaft or axle of rotation (Z, Y) suited to be positioned vertically or horizontally and N blades (1) mounted on the axle (Z, Y).

The shaft or axle of rotation (Z, Y) is suited to be appropriately and in any case connected to at least one generator (B), as shown in FIGS. 1, 2, 3a, and 3b.

In the examples in the figure, the wind turbine (A) comprises three blades (1), arranged substantially parallel to the axle of rotation (Z, Y) and distributed with axial symmetry. However, these blades (1) can have a substantially helical, spiral, catenary, or other shape.

Each of the blades (1) has an airfoil particularly shaped, for example asymmetric with a hump-like or convex arrangement, or any other form.

Each of the blades (1) is indirectly bound to the axle (Z, Y) via one or more radial arms (3), in turn integral with the axle (Z, Y), and wherein the blades (1) can move with respect to the axle (Z, Y) in the radial direction, due to the centrifugal force created during the rotation of the blades (1) themselves by the action of the wind.

Figure 1:
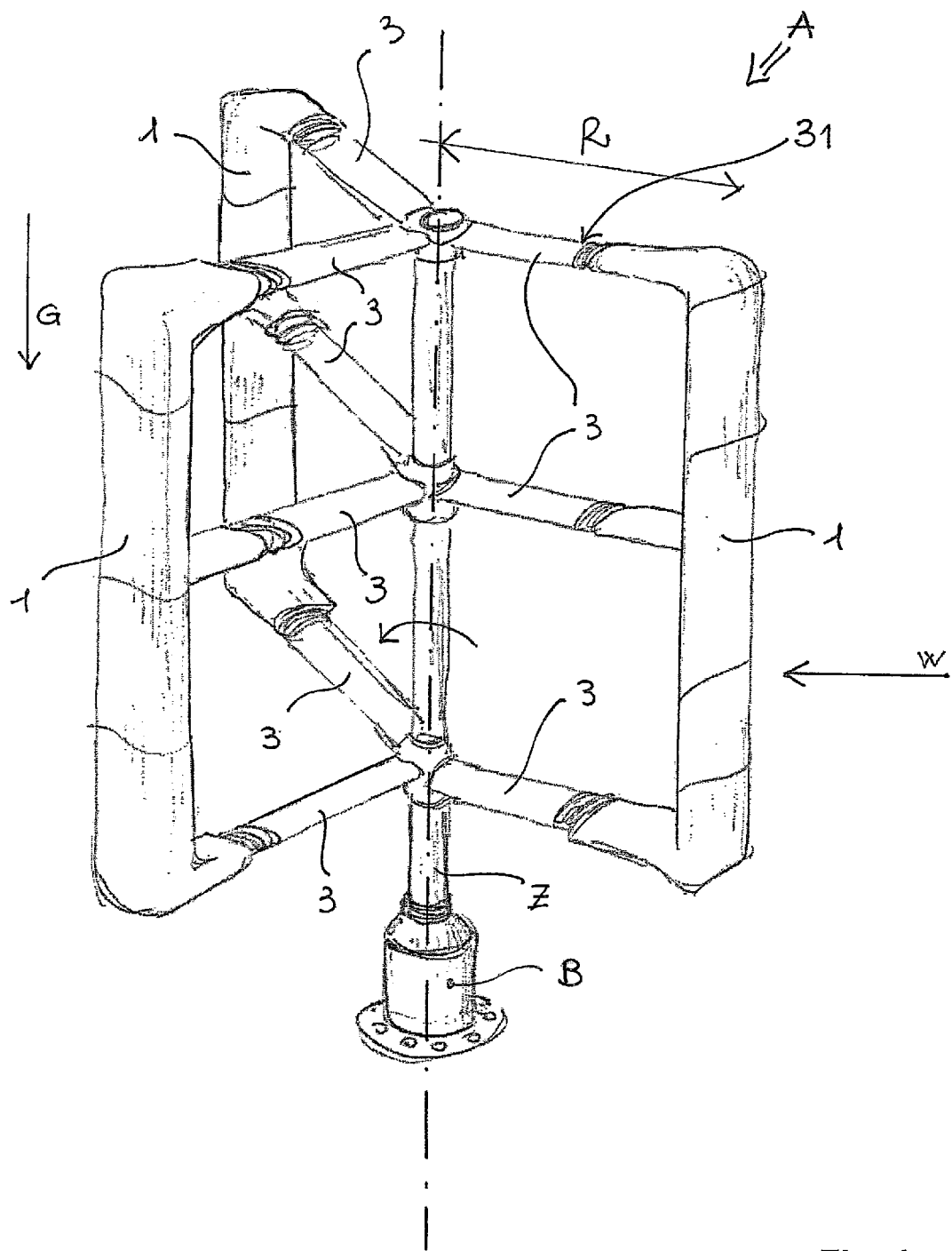
Figure 2:
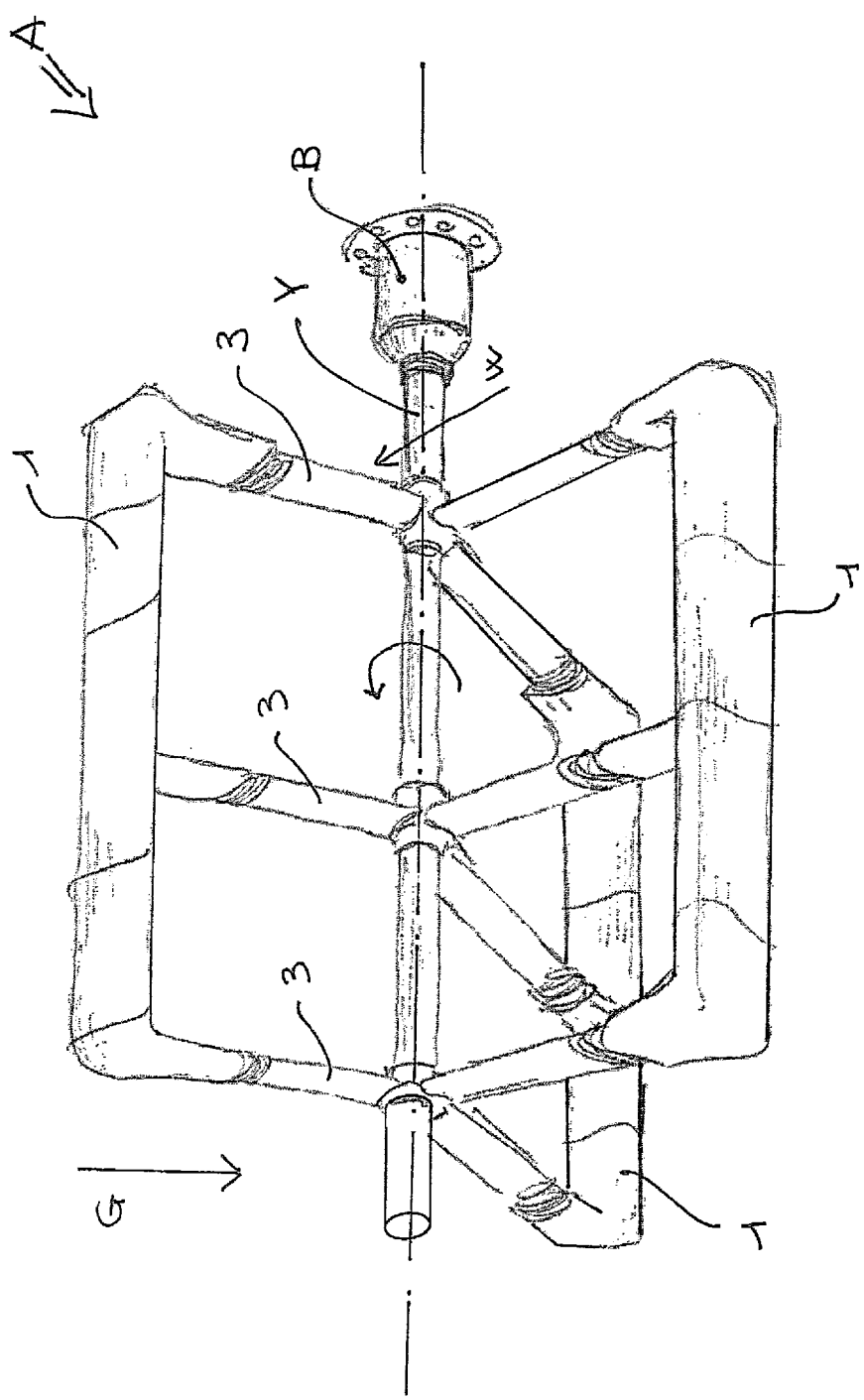

In the embodiment in FIGS. 1 and 2, the blades (1) are bound with the ability to carry out a translational motion in the radial direction with respect to the relative arms (3), being bound to each other via elastic means as shown in detail in FIG. 5.

Unlike U.S. Pat. No. 5,083,901A relating to "Venturi slots" between a central drum and radial blades, the innovation of this invention is also that the blades are not pushed to the minimum radius by compression springs, but are driven toward the maximum radius by traction springs (13).

In the embodiment shown, the blades (1) comprise holes (103) for the insertion of the free end (31) of the arms (3), in turn equipped with means or wheels or bearings (32) for the sliding of the arms (3) on the inner wall of the holes (103) of the blades (1).

The blades (1) may also comprise means or wheels or bearings (104) for the sliding of part of the blades (1) along the outer surface (33) of the arms (3), where the sliding takes place with or without play, to allow any inclination of the blades (1) with respect to the arms (3).

The radial translation of the blades (1) is countered, at least towards the outside, by springs (13) coaxially inserted in the arms (3) and in turn bound with one end (132) to the arms (3) and with the opposite end (131) to the blade (1).

In the embodiment in FIGS. 3a, 3b, 5a, 5b, 5c, 6, the blades (1) are movable in a radial direction along the relative arms (3), sliding on rails (2) obtained by dividing the section of the radial arm (3) for example into two C-shaped rails.

Again, unlike U.S. Pat. No. 5,083,901A, the innovation of the invention consists in the fact that the blades are not pushed to the minimum radius by means of compression springs, but are guided toward the maximum radius by means of tension springs (13).

Each blade (1) is able to translate in the radial direction by means of at least one but preferably at least two main wheels (4) that roll along the rails (2). Each of the one or preferably two or more main wheels (4) is mounted on a sliding frame (5) integral and assembled together with the blade (1) by one or more end plates (6) joined by fixing means (7) to the blade (1) itself, for example with screws. For this purpose the blade (1) is provided with at least one hole (8) for the insertion of the radial arm (3), with a shape like the arm (3) itself with an outer offset or play (9) along the circumferential direction. The space of the external offsets (9) houses a suitable number of smaller wheels (10) that allow a play (11) between their rolling profile and the outer wall (31) of the radial arm (3): the play (11) is designed to allow a slight rotation of the blade (1) around the axles (12) of the main wheels (4), thus allowing a passive variable inclination.

FIGS. 5a and 5d show a schematic representation of how the play is allowed and controlled by the presence of at least one or preferably two wheels (10) on the two edges, with a stabilizing function.

Alternatively, as shown in FIG. 5b, the play can be minimized or annulled, and in that case the preferred configuration provides for a single wheel (10) on the two edges.

Unlike the patent family comprising U.S. Pat. No. 4,299,537, the variable inclination in the present invention is controlled by gravity in the embodiments shown in FIG. 3. In contrast, in the case of FIG. 5b the play (11*) is minimized to the mechanical tolerance such as to enable the rolling, thereby nullifying the effect of the variation of the inclination of the blade (1), which may therefore also be mounted with a fixed pitch in the field of the invention.

The relative position of the axle (12) of each main wheel (4) with respect to the center of gravity of the blade (1) and the center of pressure of the aerofoil of the blade (1) is also part of the invention, since it is controlled by balancing the centrifugal, aerodynamic and gravity effects as a function of the constraint between the blade (1) and the arm (3).

The sliding frame (5) also comprises a hinge joint (51) to which the hook (131) of a traction spring (13) is connected: the traction spring (13) through its stiffness adjusts the variable radius (R) of the turbine (A) when the centrifugal force acts, opposing the translational motion of the blade (1) at least outwards.

The use of the invention in variable wind conditions includes, as part of its fields of application, the wind source generated by traffic, for which the optimal arrangement is the horizontal configuration (FIG. 2, FIG. 3) in which the lower encumbrance of the turbine (A) is placed at the level of the minimum clearance permitted by law with respect to the level of the road surface or the railhead.

Figure 7:
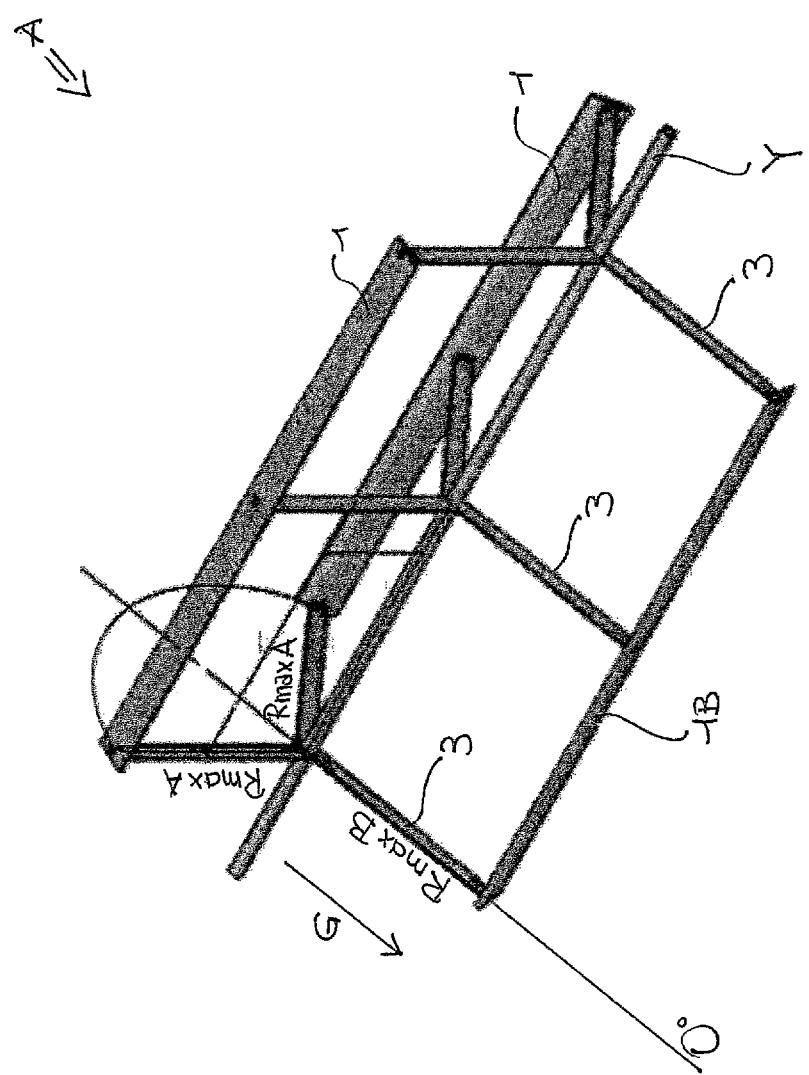

As a further specification for the embodiment shown in FIG. 7, the same device of the invention that allows the solidity Nc/R to vary as in FIG. 5, may be designed to operate in a specifically different manner as a function of the single blade (1).

In fact the tension springs (13) constraining one of the blades (1) may have a stiffness or configuration or mechanical characteristics different from those constraining the remaining blades (1), such that the turbine (A) has asymmetrically distributed blades (1) to facilitate a selective stop position.

For example, with N=3, an increase in the stiffness of the spring (13), determined for example, but not only, by the number of windings, of a blade (1) with respect to that of the other two blades (1) introduces an imbalance, allowing the machine to stop in the inverted Y position.

In contrast, a decrease in the stiffness of the spring (13), determined for example, but not only, by the number of windings, of the blade (1) itself with respect to the others, introduces an imbalance which allows the machine to stop in the Y position, with reference to the gravity (G) and to the direction of the incoming wind (W).

The desired imbalance is obtainable by varying the configuration or the mechanical characteristics of the springs (13) and/or the application of one or more weights to the arms (3) and/or of the blades (1) according to the most suitable arrangement.

In the example of FIG. 7, the blade (1B) at its maximum radius (R max B) is facing downwards, in a Y configuration, establishing the 0° position.

These embodiments are applicable with the axle (Y) positioned horizontally. A similar device may then allow the simultaneous attainment of the previously described main inertial effect, together with a selective stop in two preferential positions: the Y position, associated with the initial imbalance of a blade is particularly relevant for this invention. In fact, the torque maps of the prototypes and of the simulation show that with no rotation speed for N=3, the torque value in a CAWT is positive for all the blades only if the machine has a preferential startup angle ranging from approximately −5° to +5°, which is the Y position obtained with the device described to create an imbalance. The invention is therefore able to improve the self-start ability by the use of this selective stop device.

The new wind turbine (A) also comprises, on each of the arms (3), at least one stop element (CC, CC1) suited to limit the translation of the blades (1) towards the outside and wherein, when the blades (1) are at the maximum distance from the axles (Z, Y), the blades (1) are in contact with the stop elements (CC, CC1), forming an airfoil determined by the union of the profile of the blade (1) and the profile of the stop element (CC, CC1).

Figure 6:
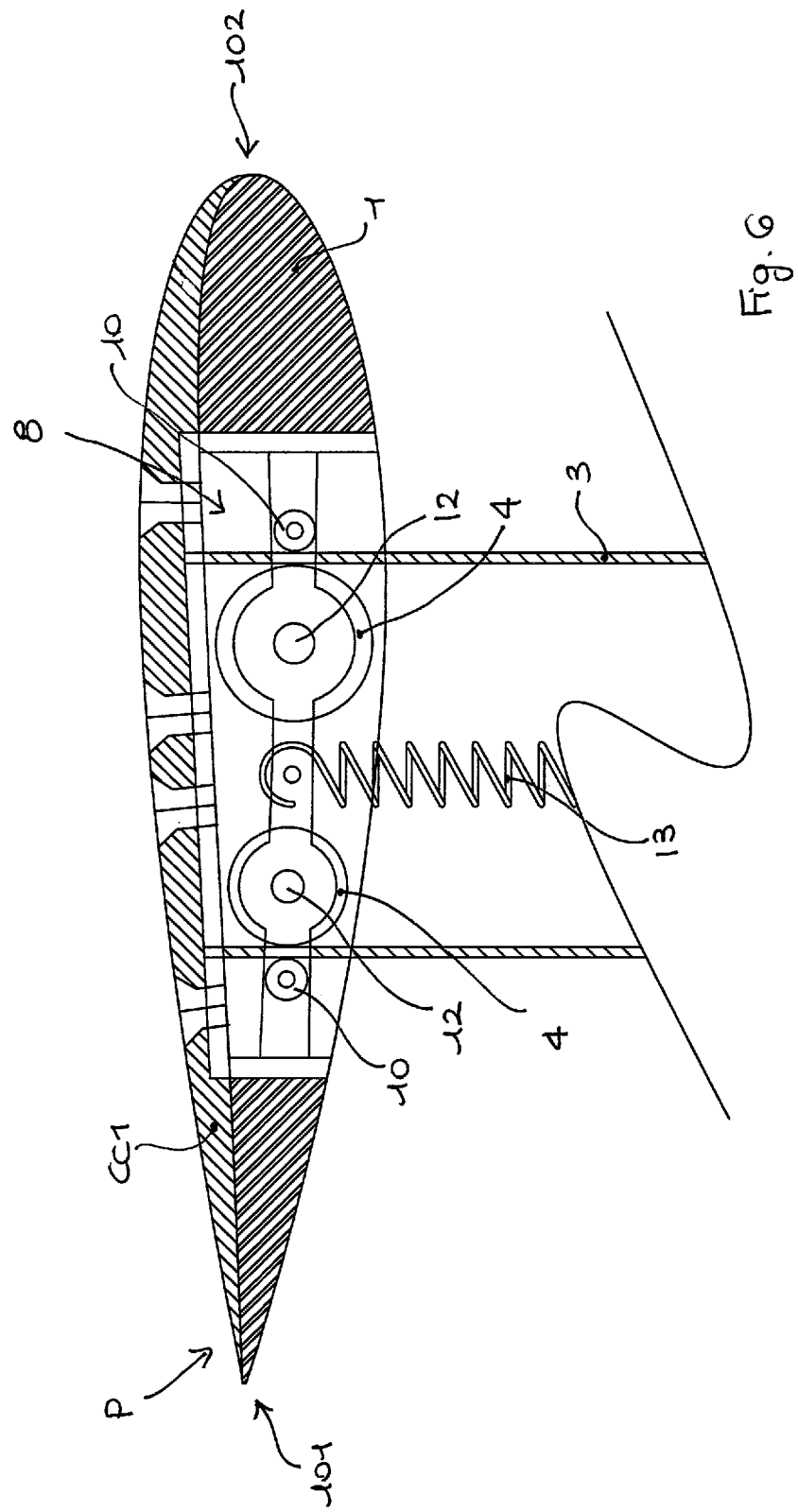

In the position at its maximum radius (R max), and therefore in the stationary condition, the blade (1) is projected by the centrifugal force onto the radial spring (13) against the aerodynamic stop element (CC, CC1), which may be local on the radial arm (3) (FIG. 3a) or fully extended (CC1) along the length of the blade (3) (FIG. 3b): therefore, depending on the embodiment, any passive variable pitching system is prevented from operating since the blade (1) is blocked at the maximum radius (R max), in the classic "Darrieus" tangential position, given that it is pressed against the stop element (CC, CC1) of FIG. 6.

Figure 3A:
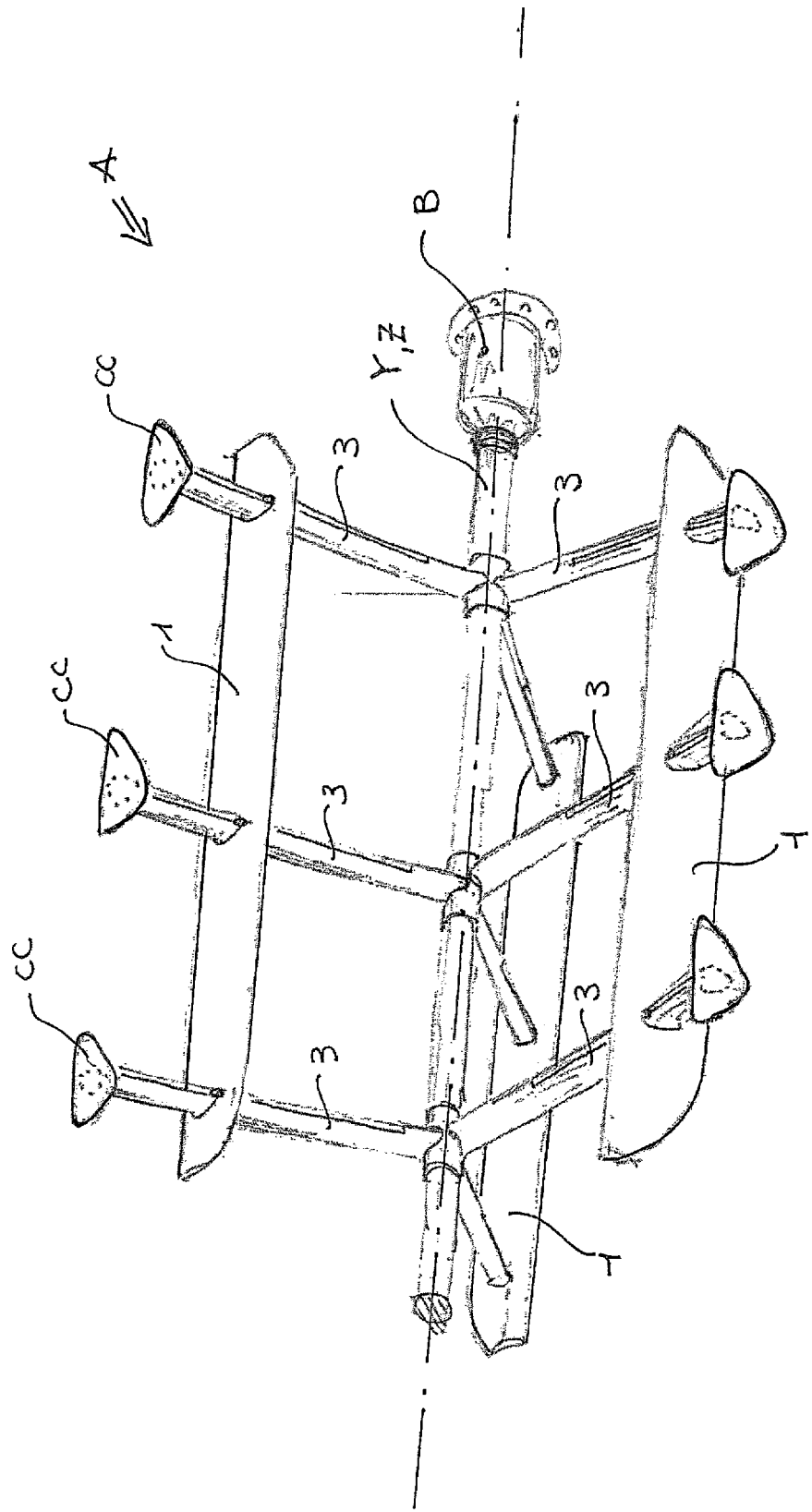
Figure 3B:
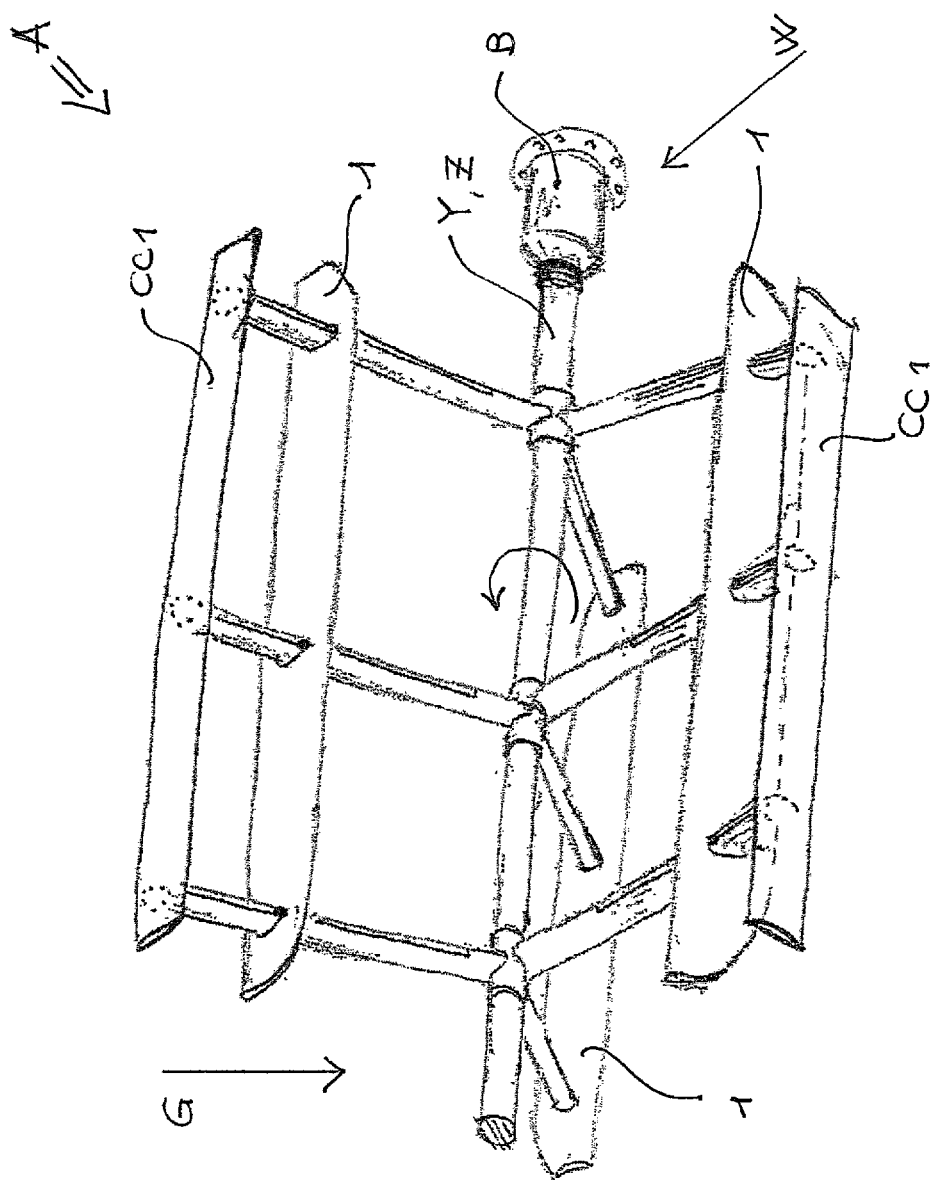
Figure 9:
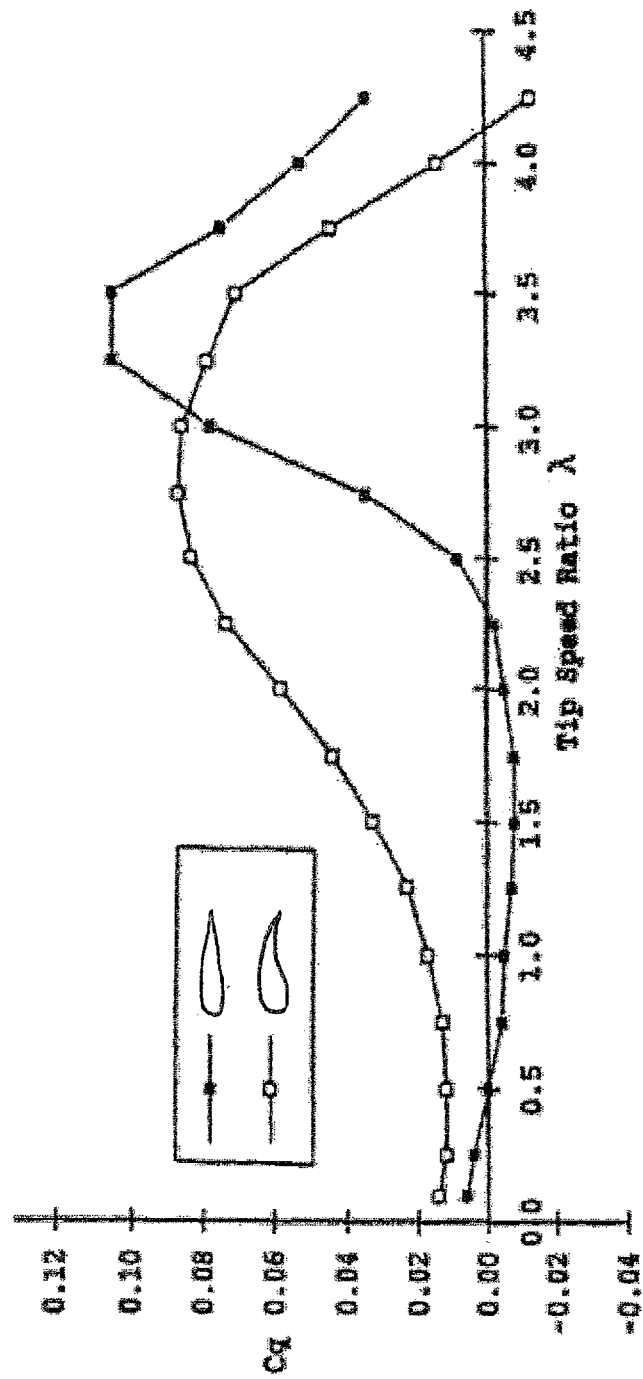
FIG. 9 is a graph showing the dimensionless torque coefficient as a function of the blade speed/wind speed ratio, for a classic symmetrical airfoil (NACA 0015) and for a classic asymmetric airfoil (NACA 4415).

The improvement in the ability to self-start can be achieved by the use of asymmetrical hump-like/convex airfoils, which in the configuration in FIG. 3b, when operating at full potential and therefore in contact with the extended stop element (CC1), an additional airfoil is created, this time basically symmetrical (FIG. 6): thus the invention optimizes the performance of the machine by the use of asymmetric profiles for the startup stages and essentially symmetrical profiles when at its full potential, as explained by the two different curves in FIG. 9, which can both be comprised in the behavior of the invention. The stop elements (CC, CC1) which come into contact with the tip of the blade (1) of the invention can also be designed with a straight leading edge (102) and a blunted trailing edge (101) as in FIG. 3 and FIG. 6 so as to create a lower vorticity and thus to reduce the energy losses before the conversion.

Figure 8:
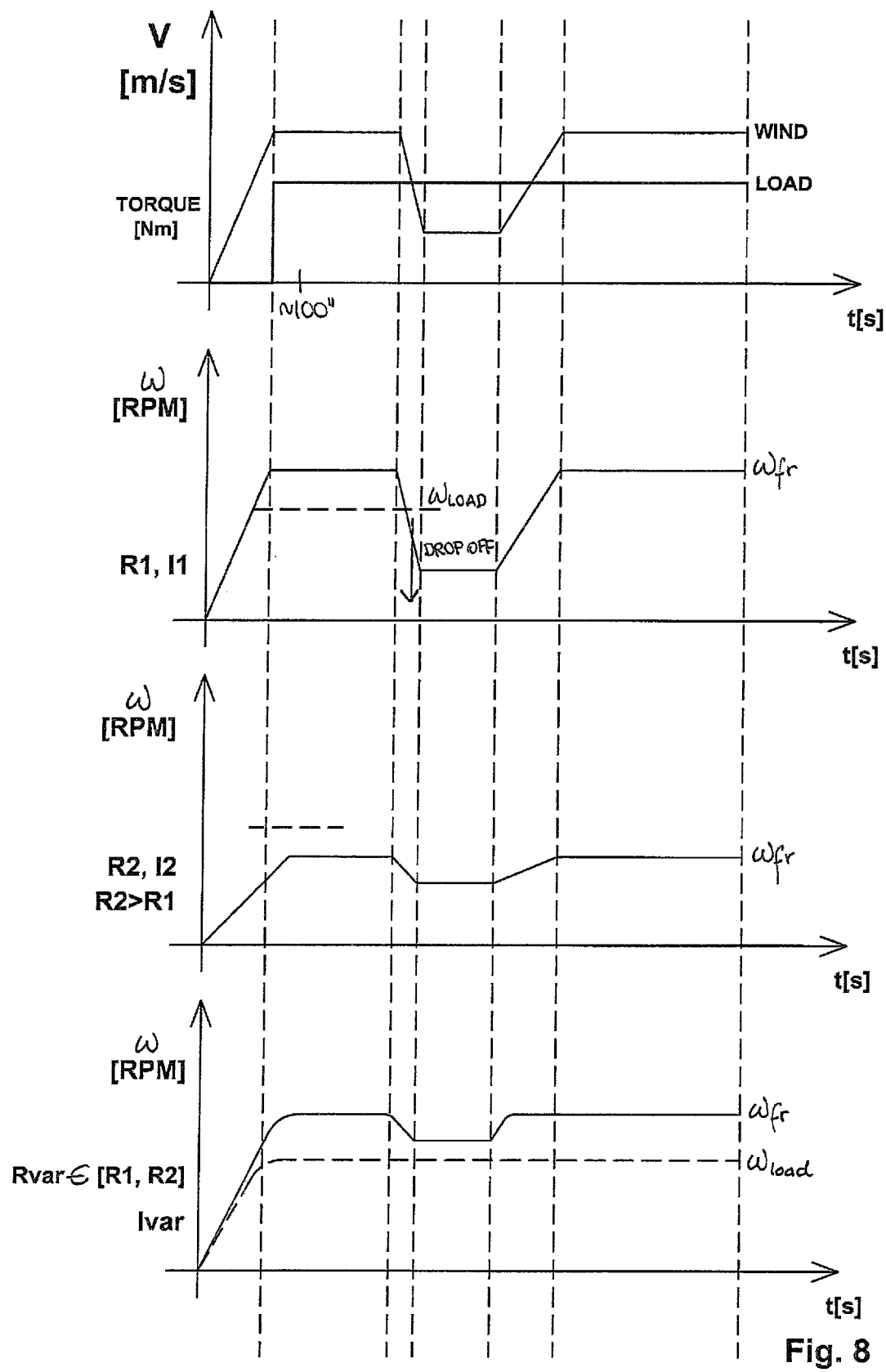
FIG. 8 shows four graphs showing the behavior of the free-ride speed ($\omega_{fr}$) of a CAWT with transient winds and its blades mounted on springs with adequate stiffness that allow the blades to oscillate between a min and max radii, compared to 2 CAWTs of the prior art with a fixed min radius and max radius.

As shown in FIG. 8, while the machines with a constant radius of the art can extract the minimum or no power during a windless air pocket, the machine of the invention can extract more energy during such events since the free-ride speed of the turbine (A) with the variable radius (R) is higher than in the cases with constant radius (R1, R2), thanks to the variable inertia device of the invention.

Therefore, with reference to the preceding description and the attached drawings the following claims are made.

The invention claimed is:

1. A wind turbine (A) comprising:
a rotation axis (Z, Y) configured to be positioned in space in any way and a plurality of blades (1) constrained to said axis (Z, Y),
wherein each one of said blades (1) is indirectly constrained to said axis (Z, Y) through one or more radial arms (3) that are integral with said axis (Z,Y),
wherein said blades (1) are configured to translate in a radial direction with respect to said axis (Z, Y) during rotation of the blades (1),
wherein, by varying a distance of each of said blades (1) from said axis (Z, Y), a radius of a rotor varies as does a main inertia of said wind turbine, from a minimum value at startup to higher values, such to limit a decrease and favor an increase in speed of the rotation, respectively in case of a decrease or increase of transitional winds,
wherein each one of said blades (1) is constrained to the corresponding arms (3) to counteract said radial translation of the blades (1) at least in the direction away from said axis (Z, Y), said blades being constrained by one or more elastic members or springs (13) coaxially inserted in said arms (3) and being directly or indirectly constrained to said arms (3) with one end (132) and to said blade (1) with an opposite end (131),
wherein each one of said blades (1) translates in a radial direction along the respective arms (3) rolling on rails or grooves or slits (2) obtained in the arms (3), and
wherein each blade (1) comprises:
at least one hole (8) for insertion of the arm (3), into a shape matching a shape of the arm (3) with a play (9) along a circumferential direction;
a frame (5) mounted in said hole (8) of said blade (1) and integral with the blade (1); and
at least one main wheel (4) configured to rotate in said rails (2) or grooves or slits inside said arm (3) and mounted on said frame (5).

2. The wind turbine (A) according to claim 1, wherein, in said play (9) between the blade (1) and the arm (3), there are one or more smaller wheels (10) or bearings constrained to said frame (5) of the blade (1), with or without play (11, 11*) between their rolling profile and an external wall (33) of the radial arm (3), in order to allow or prevent any change in an inclination between said blade (1) and the respective arms (3).

3. The wind turbine (A) according to claim 1, further comprising, on each one of said arms (3), at least one stop element (CC, CC1) configured to limit an outward translation of said blades (1), wherein, when said blades (1) are at the maximum distance from the axis (Z, Y), said blades (1) rest against said at least one stop element (CC, CC1), forming a resulting aerodynamic profile (P) determined by a combination of a profile of the blade (1) with a profile of the stop element (CC, CC1).

4. The wind turbine (A) according to claim 3, wherein said resulting aerodynamic profile (P) is symmetrical.

5. The wind turbine (A) according to claim 3, wherein there is a stop element (CC) on each one of said arms (3).

6. The wind turbine (A) according to claim 3, wherein the wind turbine comprises a single extended stop element (CC1) mounted between the arms (3) of the same blade (1), said extended stop element (CC1) and said blade (1) having asymmetrical aerodynamic profiles such that at high speeds the resulting aerodynamic profile, with the blade (1) positioned at the maximum distance, substantially produces a higher torque in the wind turbine (A), than the torque of the profile of the blade (1).

7. The wind turbine (A) according to claim 6, wherein said stop element and a tip of said blades (1) each have a straight leading edge (102) and a blunted trailing edge (101) so as to reduce vorticity and consequently energy losses upstream.

8. The wind turbine (A) according to claim 1, wherein said wind turbine (A), with the axis (Y) arranged horizontally, has blades (1) distributed in an asymmetrical way during a start stage, such that one or more of said blades (1) has/have a different distance from the axis (Y) compared to one or more additional blades (1), in order to favor a position of selective stop, and wherein said distance of the blades (1) from said axis (Y) is regulated by stiffness, configuration, mechanical characteristics of said elastic members or springs (13), and/or by application and distribution of one or more weights on one or more of said blades (1) and/or on one or more of said arms (3) such to obtain a desired unbalance.

* * * * *